United States Patent Office 3,440,189

Patented Apr. 22, 1969

1

3,440,189
PARTICLE BOARD

John Arthur Sharp, Beloeil, Quebec, Canada, assignor to Canadian Industries Limited, Montreal, Quebec, Canada, a corporation of Canada No Drawing. Filed Nov. 21, 1966, Ser. No. 601,272
Claims priority, application Canada, Nov. 27, 1965, 946,436
Int. Cl. C08g *51/18;* B32b *21/02*
U.S. Cl. 260—9 3 Claims

ABSTRACT OF THE DISCLOSURE

A particle board fabricated from wood particles bonded by a thermoset adhesive containing an organic polyisocyanate and "Vinsol" resin. The bonding procedure is carried out at 180° to 400° F. under a pressure of 200 to 450 pounds per square inch. The water resistance of the particle board makes it suitable for outdoor applications.

This invention relates to a novel adhesive and to particle board fabricated therewith.

It is known to fabricate particle board from wood fragments such as chips using a thermosetting resin to bond the particles together. Such resin-bonded particle board is a well known article of commerce. Among the resins that have been employed for bonding, there may be mentioned phenol - formaldehyde, cresolformaldehyde, resorcinol-formaldehyde, melamine-formaldhyde, urea - formaldehyde and condensed furfuryl alcohol resins. The water resistance of the resin-bonded particle board is dependent upon the nature of the bonding resin. The commonly employed urea-formaldehyde resin results in a particle board that is satisfactory for use in dry environments only, the water resistance being deficient. A water-resistant particle board can be produced using phenol-formaldehyde or melamine-formaldehyde resins as binders but such board is more costly and thus cannot compete with an alternative material, plywood. Since there exists a large potential field of use in the building industry for water-resistant particle board, it is of evident commercial advantage to provide a low-cost, water-resistant product.

It has been found that a water-resistant particle board suitable for outdoor applications and of competitive cost can be fabricated from wood particles bonded by a thermosetting adhesive comprising an organic polyisocyanate and a resinous hydroxyl group-containing material obtained from pine wood and known as "Vinsol" resin. Particle board bonded with the novel adhesive has a perpendicular tensile strength of greater than 50 p.s.i. and possesses resistance to boiling water similar to particle board bonded with phenol-formaldehyde resins. The novel particle board can be fabricated employing standard industrial press equipment.

It is thus a primary object of this invention to provide a resin-bonded particle board suitable for outdoor applications. A further object is to provide a resin-bonded particle board of competitive cost. Additional objects will appear hereinafter.

The particle board of this invention comprises wood particles bonded together by an adhesive composition comprising an organic polyisocyanate, a resinous hydroxyl group-containing material derived from pine wood, and a basic catalyst.

The wood particles suitable for fabricating the particle board are normally in the size range between 4 to 20 mesh. The usual source of the wood particles is the waste from wood manufacturing. It is necessary to separate the fine sawdust from the material since the presence of this mate-

2 rial results in excess absorption of bonding resin. The wood particles normally will be employed when they have a moisture content of from 6% to 10% by weight. In the case of certain types of wood waste it may be necessary to reduce the size of the wood chips by further grinding.

The organic polyisocyanate ingredient is selected from those organic compounds containing at least two isocyanate groups in their molecules, said organic compounds being aliphatic, aromatic or aryl aliphatic. Suitable organic isocyanates are tolylene 2,4-diisocyanate; mixtures of tolylene 2,4- and 2,6-diisocyanate; diphenylmethane diisocyanates; 4,4′-diisocyanate-3, -methyl diphenylmethane; m- and p-phenylene diisocyanates; chlorophenylene diisocyanate; chlorophenylene 2,4-diisocyanate; toluene, 2,4,6-triisocyanate; 4,4′,4′-triphenylmethane triisocyanate and diphenyl ether 2,4,4′-triisocyanate.

The resinous hydroxyl group-containing ingredient derived from pine wood is known commercially as "Vinsol" resin. "Vinsol" is a hard, brittle, non-tacky, high-melting thermoplastic material which appears black in reflected light and which is ruby red when viewed by transmitted light through thin sections. It is an extract of pine wood, such as southern pine, particularly the stump, and is composed of a complex mixture of acidic materials derived from rosin acids and oxidized rosin acids, neutral high molecular weight compounds, and acidic phenolic materials in the form of substituted phenolic ethers, polyphenols, and other high molecular weight phenols. It is gasoline-insoluble and aromatic hydrocarbon-soluble; is saponifiable and esterifiable with polyhydric alcohols; and has an acid number of 90 to 105. Typical analysis values for it are: saponifiable number 165; methoxyl (—$OCH_3$) content (ASTM or AOAC) percent 5.3; density (at 25° C.) 1.218; softening point 110° C. minimum, 125° C. maximum; gasoline soluble 20 percent maximum; and toluene insoluble 25 percent maximum.

The basic catalysts suitable for use as ingredients of the adhesives include tertiary amines such as triethylamine, tri-N-propylamine, N,N-dimethyl cyclohexylamine, and triethanolamine, and secondary amines such as diethylamine, di-n-propylamine, diethylene triamine and diethanolamine.

The wood adhesive is employed in proportions of from 5% to 25% by weight of wood particles used in the particle board. The catalyst is employed in proportions of from 0.10 %to 7.0% by weight of the wood particles. The ratio of organic polyisocyanate ingredient to "Vinsol" resin ingredient may be from 3:1 to 3:4 by weight.

The particle board is fabricated by spraying the wood particles, having a moisture content of 6% to 10% by weight, with a solution or dispersion of the adhesive. If desired, the catalyst may be sprayed on the wood particles separately from the remainder of the adhesive composition. The wood particles coated with adhesive are next placed in a press and subjected to pressure in the range of 200 to 400 pounds per square inch and temperatures in the range 180° F. to 450° F. for a period of from 5 to 60 minutes. The longer pressing periods result in an increase in strength of the particle board but do not substantially affect the moisture absorption of the board.

The particle board of this invention has a tensile strength comparable to that of commercial particle board wherein the adhesive is phenol-formaldehyde or urea-formaldehyde resin. The water-absorption of the particle board of this invention is comparable to that of commercial phenol-formaldehyde bonded particle board and superior to that of commercial urea-formaldehyde bonded particle board.

The invention is additionally illustrated by the following examples.

Examples 1 to 5

Commercial wood shavings, being the waste from lumber manufacturers, were screened and the fraction passing a 4 mesh screen but resting on an 8 mesh screen was used. The 4 to 8 mesh fraction was allowed to reach a moisture content in equilibrium with the atmosphere, approximately 10% by weight.

Specified amounts of a pine wood derivative ("Vinsol" resin) containing 14% by weight of hydrocarbons, 26% by weight of resin acids, and 60% by weight of phenolic material, and of diphenylmethane diisocyanate, dissolved in acetone were sprayed over the wood shavings so as to obtain a uniform distribution. Then a solution of amine catalyst was sprayed over the wood shavings.

After the binder and catalyst had been uniformly distributed over the wood chips, the coated chips were placed in a stainless steel disc mould approximately 1 inch deep and 5 inches in diameter. For pressing at temperatures below 350° F., polyethylene terephthalate polyester sheet was placed on both faces of the mould to prevent adhesion of the particle board to the mould. At higher temperatures aluminum foil was used for this purpose. The mould was then placed in a hot press under desired conditions of temperature, pressure and time of pressing.

After removal from the mould the particle board was allowed to cool and its density, perpendicular tensile strength and water absorption were measured.

The perpendicular tensile strength was measured employing a 2" by 2" or 1" by 1" piece of the board which was bonded on opposite faces to two steel clamps having 2" by 2" faces using polyvinyl aectate ("Bondfast") adhesive. The steel clamps were attached to the jaws of a Hounsfield tensometer and pulled apart at constant speed until the particle board broke. The tension at which the board broke was recorded.

Water absorption was determined by immersing a weighed 5 inch diameter semi circle of board in water at 70° F. for 20 hours, wiping off surface water and reweighing. A second test was carried out by placing a sample of board in boiling water for 30 minutes and determining the water absorption.

The particle board prepared and their characteristics are shown in the following table which shows also comparable tests of commercial particle boards bonded by phenol-formaldehyde and urea-formaldehyde resins.

TABLE

| Ex. | Binder Composition: Resin, percent by weight of wood | Binder Composition: Catalyst, percent by weight of wood | Pressing Conditions Time 30 Min.: Temp., ° F. | Pressing Conditions Time 30 Min.: Pressure, p.s.i. | Board Characteristics: Density, g/cc. | Tensile Strength Perpendicular: 2" x 2" board pounds | Tensile Strength Perpendicular: 1" x 1" board pounds | Water Absorption: 20 hrs. at 70° F., percent dry wgt. | Water Absorption: 30 min. at 212° F., percent dry wgt. |
|---|---|---|---|---|---|---|---|---|---|
| 1 | 3% "Vinsol"<br>4% Diphenylmethane diisocyanate | 0.1% Diethylenetriamine | 200 | 450 | 0.94 | ---------- | 180 | 51.4 | 76.6 |
| 2 | 6% "Vinsol"<br>2% Diphenylmethane diisocyanate | 0.5% Diethylenetriamine | 250 | 300 | 0.61 | 214 | ---------- | 143.0 | ------- |
| 3 | 4% Diphenylmethane diisocyanate<br>3% "Vinsol" | 0.3% Triethanolamine<br>0.05% N,N-dimethylcyclohexylamine | 200 | 400 | 0.78 | >400 | ---------- | 57.5 | 89.4 |
| 4 | 4% Diphenylmethane diisocyanate<br>3% "Vinsol" | 0.25% Diethylenetriamine | 250 | 300 | 0.65 | >400 | 58 | 93.0 | ------- |
| 5 | 4% Diphenylmethane diisocyanate<br>3% "Vinsol" | 0.3% Triethanolamine<br>0.05% N,N-dimethylcyclohexylamine | 250 | 400 | 0.81 | ---------- | 212 | 68.2 | ------- |
| | Commercial phenyl-formaldehyde bonded particle board | | | | 0.73 | ---------- | 104 | 41.0 | 69.0 |
| | Commercial urea-formaldehyde bonded particle board "A" | | | | 0.68 | ---------- | 95 | 33.3 | 143.0 |
| | Commercial urea formaldehyde bonded particle board "B" | | | | 0.70 | ---------- | 75 | ------- | 134.0 |

What I claim is:

1. A process for the fabrication of particle board which comprises the steps of: (A) coating wood particles of 4 to 20 mesh size and having a moisture content of from 6% to 10% by weight with 5% to 25%, by weight of the particles, of an adhesive composition comprising (1) an organic polyisocyanate and (2) a hard, brittle, non-tacky, high-melting, thermoplastic material which appears black in reflected light and which is ruby red when viewed by transmitted light through thin sections; being an extract of pine wood, such as southern pine, particularly the stump; and being composed of a complex mixture of acidic materials derived from rosin acids and oxidized rosin acids, neutral high molecular weight compounds, and acidic phenolic materials in the form of substituted phenolic ethers, polyphenols, and other high molecular weight phenols; being gasoline-insoluble and aromatic hydrocarbon-soluble, being saponifiable and esterifiable with polyhydric alcohols, and having an acid number of 90 to 105; with typical analysis values of: saponifiable number 165; methoxyl (—$OCH_3$) content (ASTM or AOAC) percent 5.3; density at 25° C. 1.218; softening point 110° C. minimum, 125° C. maximum; gasoline soluble, 20 percent maximum; and toluene insoluble, 25 percent maximum, (1) and (2) being present in weight ratio of 3:1 to 3:4, and (3) a basic catalyst selected from the group consisting of secondary and tertiary amines, the catalyst constituting 0.10% to 7.0% by weight of the particles, and (B) compressing the coated wood particles under a pressure of 200 to 450 pounds per square inch at a temperature of 180° F. to 400° F. for a period of 5 to 60 minutes to form particle board.

2. A process as claimed in claim 1 wherein the organic polyisocyanate is diphenylmethane diisocyanate.

3. A process as claimed in claim 1 wherein the basic catalyst is diethylenetriamine.

References Cited

UNITED STATES PATENTS

| | | | |
|---|---|---|---|
| 2,948,694 | 8/1960 | Reed | 260—24 |
| 3,211,674 | 10/1965 | Sandridge | 260—24 |
| 3,300,361 | 1/1967 | Brown | 161—162 |

FOREIGN PATENTS

| | | |
|---|---|---|
| 996,523 | 6/1965 | Great Britain. |

DONALD E. CZAJA, *Primary Examiner.*

WILLIAM E. PARKER, *Assistant Examiner.*

U.S. Cl. X.R.

156—62.2; 161—168, 170; 168—190; 260—2.5, 24